United States Patent
Sumiya

(10) Patent No.: US 10,083,717 B2
(45) Date of Patent: Sep. 25, 2018

(54) TAPE CARTRIDGE HOUSING CASE

(71) Applicant: FUJIFILM CORPORATION, Minato-ku, Tokyo (JP)

(72) Inventor: Yosuke Sumiya, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 78 days.

(21) Appl. No.: 15/151,504

(22) Filed: May 11, 2016

(65) Prior Publication Data

US 2016/0336038 A1  Nov. 17, 2016

(30) Foreign Application Priority Data

May 13, 2015  (JP) ................................. 2015-098340

(51) Int. Cl.
   *G11B 23/023*  (2006.01)
   *B65D 21/02*  (2006.01)

(52) U.S. Cl.
   CPC ........ *G11B 23/023* (2013.01); *G11B 23/0233* (2013.01); *B65D 21/0202* (2013.01)

(58) Field of Classification Search
   CPC .... B65D 21/0202; B65D 43/01; B65D 43/20; B65D 7/10; B65D 11/12; B65D 9/08; B65D 5/38; G11B 23/023; G11B 23/0233; G11B 33/0411; G11B 33/0466
   USPC .............. 206/387.1, 387.11, 387.12, 387.13; 211/126.122
   See application file for complete search history.

(56) References Cited

U.S. PATENT DOCUMENTS

| 3,899,229 A * | 8/1975 | Ackeret ............. G11B 23/0233 312/9.57 |
| 5,964,349 A * | 10/1999 | Odagiri ................ G11B 23/023 206/387.1 |
| 2003/0146127 A1 * | 8/2003 | Morita ............... G11B 23/0233 206/508 |

FOREIGN PATENT DOCUMENTS

| JP | S49-26577 Y1 | 7/1974 |
| JP | S54-52430 U | 4/1979 |
| JP | S59-142954 U | 9/1984 |
| JP | H05-16990 A | 1/1993 |
| JP | H05-58689 U | 8/1993 |
| JP | 2002-104568 A | 4/2002 |

OTHER PUBLICATIONS

English language translation of the following: Office action dated May 8, 2018, 2018 from the JPO in a Japanese patent application No. 2015-098340 corresponding to the instant patent application.

* cited by examiner

*Primary Examiner* — Anthony Stashick
*Assistant Examiner* — Mollie Impink
(74) *Attorney, Agent, or Firm* — Solaris Intellectual Property Group PLLC

(57) ABSTRACT

There is provided a tape cartridge housing case, the case including (1) a case body having an upper wall portion that covers an upper face of a tape cartridge, a lower wall portion that covers a lower face of the tape cartridge, and an opening that the tape cartridge is inserted and removed through, (2) a first protrusion that is formed at an inner face of the lower wall portion, and that anchors an anchored portion, (3) a recess that is formed at an outer face of the lower wall portion at a position so as to be on the opposite side to the first protrusion in a front face-back face relationship, and (4) a second protrusion that is formed at an outer face of the (Continued)

upper wall portion at the same position as the recess in plan view.

4 Claims, 9 Drawing Sheets

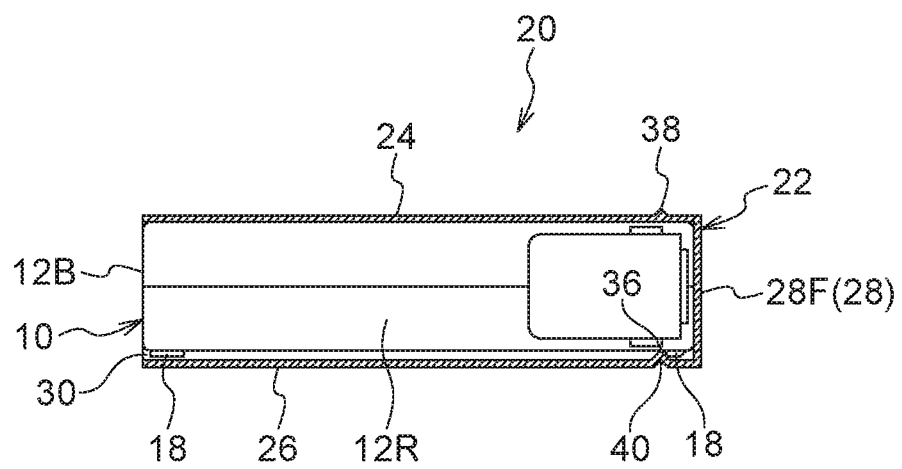
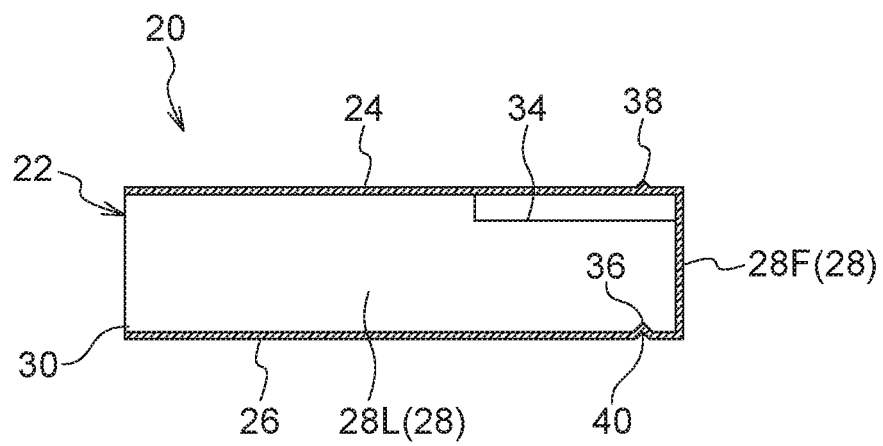

TAPE CARTRIDGE HOUSING CASE

CROSS-REFERENCE TO RELATED APPLICATION

This application claims priority under 35 USC 119 from Japanese Patent application No. 2015-098340 filed on May 13, 2015, the disclosure of which is incorporated by reference herein.

BACKGROUND

Technical Field

The present disclosure relates to a tape cartridge housing case that stores a tape cartridge.

Related Art

Known tape cartridge housing cases exist for storing tape cassettes that are loaded into a recording and playback device such as a video tape recorder to be recorded or played back (see, for example, Japanese Patent Application Laid-Open (JP-A) No. H05-16990). Such housing cases have a single opening, and the tape cassette is inserted and removed through the opening.

However, in such housing cases, the tape cassette could fall out through the opening if the opening faces downwards. Moreover, when plural housing cases in which tape cassettes are stored are stacked and put into storage, if the stacked state is unstable, the tape cassettes in the housing cases could fall under their own weight and sustain damage.

SUMMARY

The present disclosure obtains a tape cartridge housing case capable of preventing a tape cartridge from unintentionally falling out through an opening, and also capable of being stacked stably.

A first aspect of the present disclosure is a tape cartridge housing case including a case body, a first protrusion, a recess, and a second protrusion. The case body includes an upper wall portion that covers an upper face of a tape cartridge, a lower wall portion that covers a lower face of the tape cartridge, side wall portions that covers every side face of the tape cartridge with the exception of one side face of the tape cartridge, and an opening that the tape cartridge is inserted and removed through, and that exposes the one side face. The first protrusion is formed at an inner face of the lower wall portion at an insertion direction downstream side of the tape cartridge, and anchors an anchored portion formed at the lower face of the tape cartridge in an inserted state of the tape cartridge. The recess is formed at an outer face of the lower wall portion at a position so as to be on the opposite side to the first protrusion in a front face-back face relationship. The second protrusion is formed at an outer face of the upper wall portion at the same position as the recess in plan view, and that is formed with a shape capable of fitting together with the recess.

The present disclosure enables the tape cartridge to be prevented from unintentionally falling out through the opening of the tape cartridge housing case, and enables stable stacking of the tape cartridge housing case.

BRIEF DESCRIPTION OF THE DRAWINGS

Exemplary embodiments of the present disclosure will be described in detail based on the following figures, wherein:

FIG. 8A is a cross-section of a tape cartridge housing case according to the present exemplary embodiment in a state in which a tape cartridge is being stored;

FIG. 8B is a cross-section of a tape cartridge housing case according to the present exemplary embodiment in a state in which a tape cartridge is not being stored.

DETAILED DESCRIPTION

Detailed explanation follows regarding an exemplary embodiment of the present disclosure, with reference to the drawings. Note that for ease of explanation, a downstream side in an insertion direction of a tape cartridge 10 into a tape cartridge housing case 20 (indicated by arrow S in FIG. 1) is referred to as the front side of the tape cartridge 10, and the opposite side thereto is referred to as the rear side of the tape cartridge 10.

An opening 30 side of the tape cartridge housing case 20 is referred to as the rear side of the tape cartridge housing case 20, and the opposite side thereto is referred to as the front side of the tape cartridge housing case 20. Moreover, in the following explanation, reference to the left and right refers to the left and right as viewed from the rear side of the tape cartridge 10 and the tape cartridge housing case 20.

Figure 1:
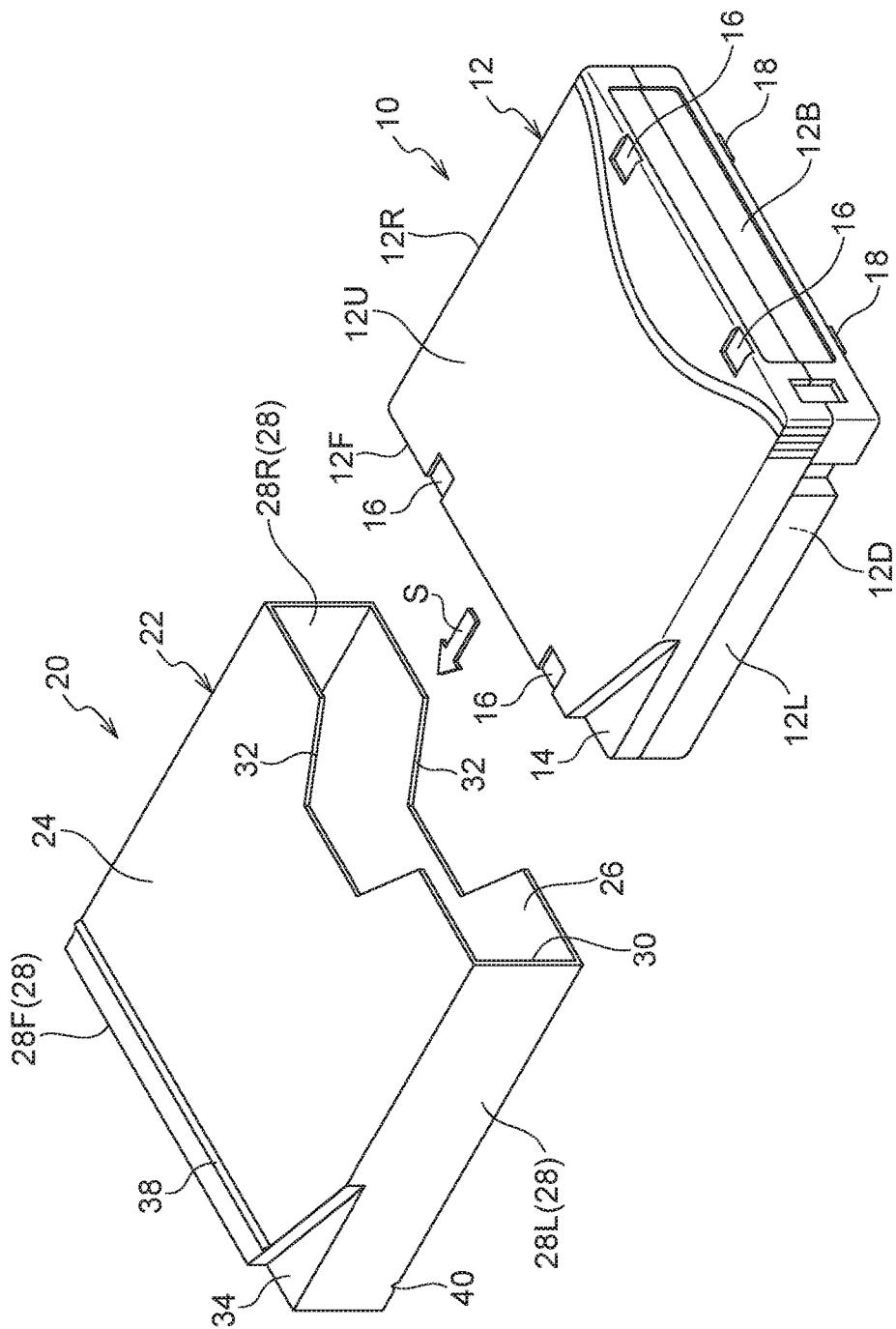
FIG. 1 is a perspective view illustrating a tape cartridge housing case and a tape cartridge according to an exemplary embodiment.
Figure 2:
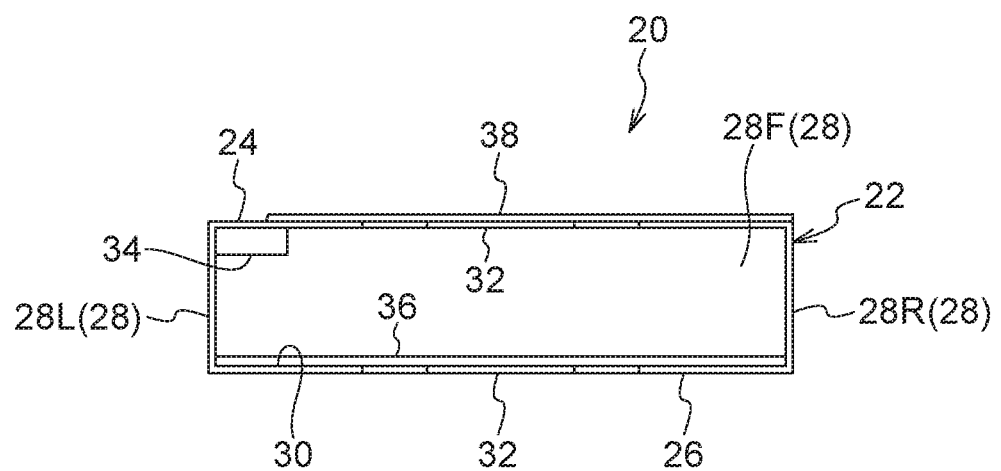
FIG. 2 is a front view of a tape cartridge housing case according to the present exemplary embodiment.
Figure 3:
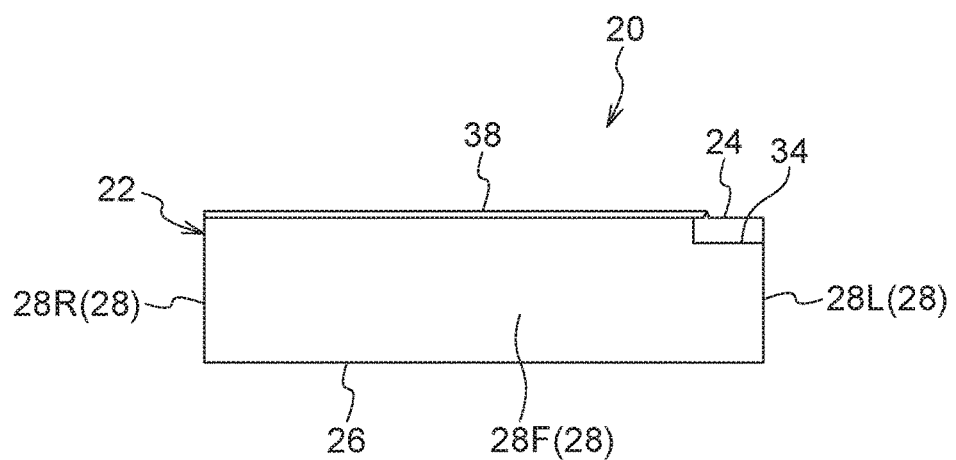
FIG. 3 is a back face view of a tape cartridge housing case according to the present exemplary embodiment.
Figure 4:
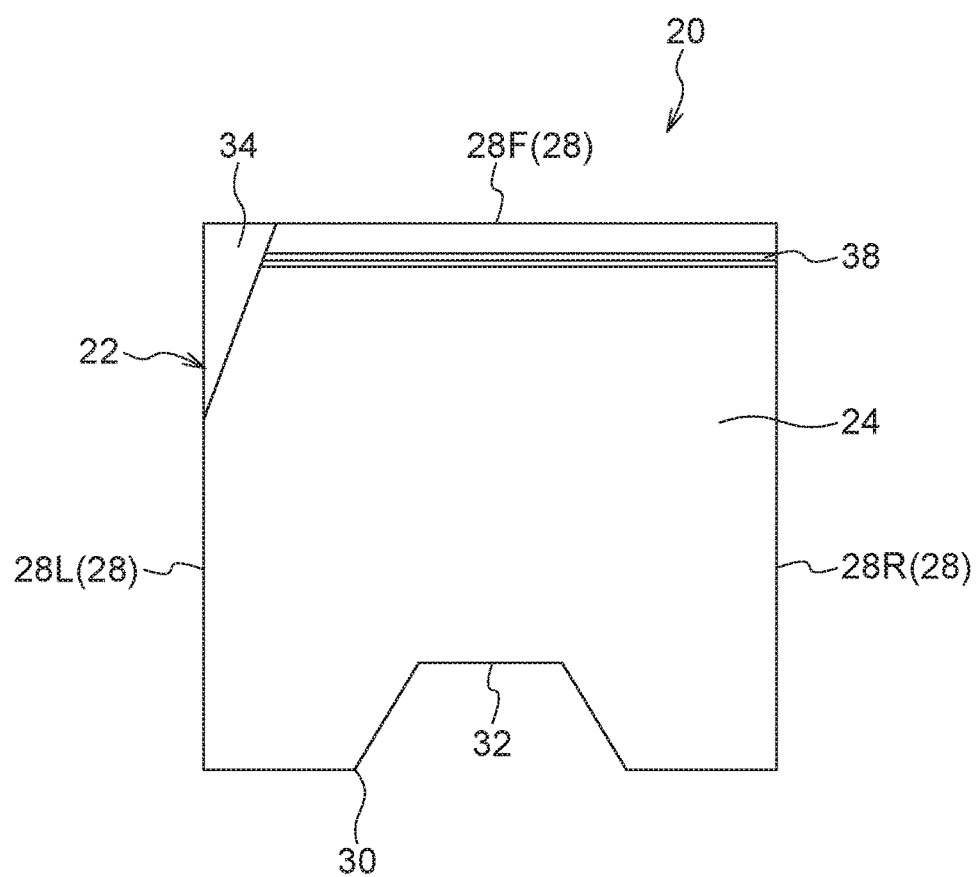
FIG. 4 is a plan view of a tape cartridge housing case according to the present exemplary embodiment.
Figure 5:
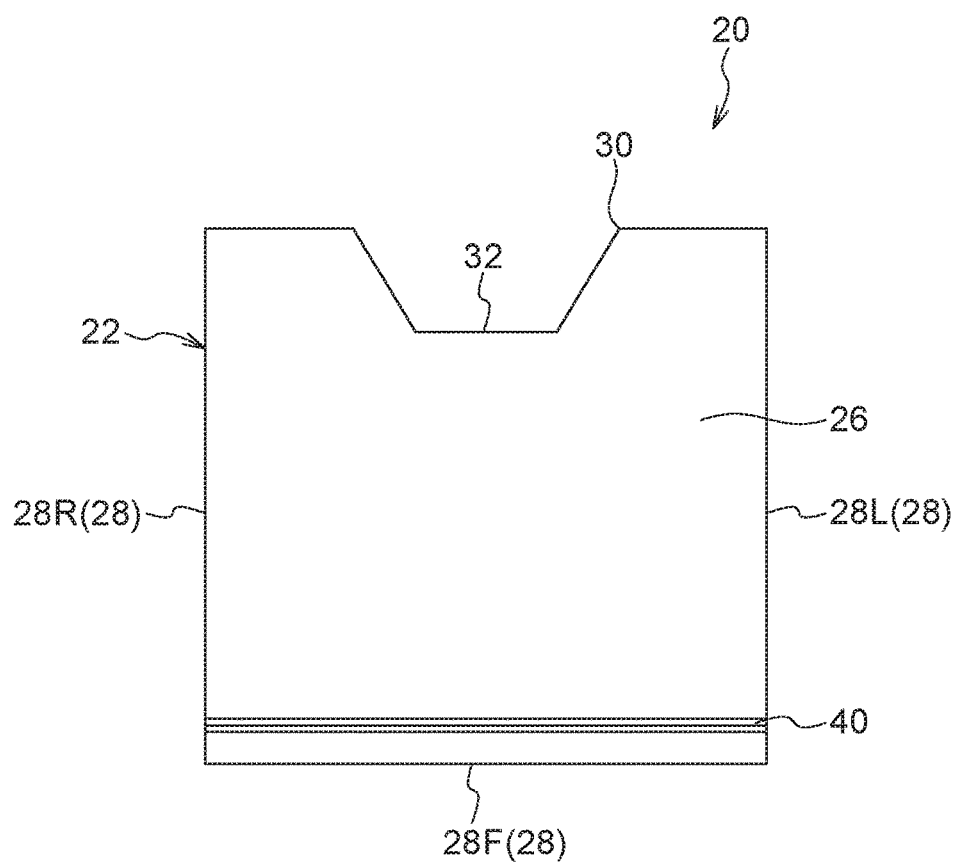
FIG. 5 is a bottom view of a tape cartridge housing case according to the present exemplary embodiment.
Figure 6:
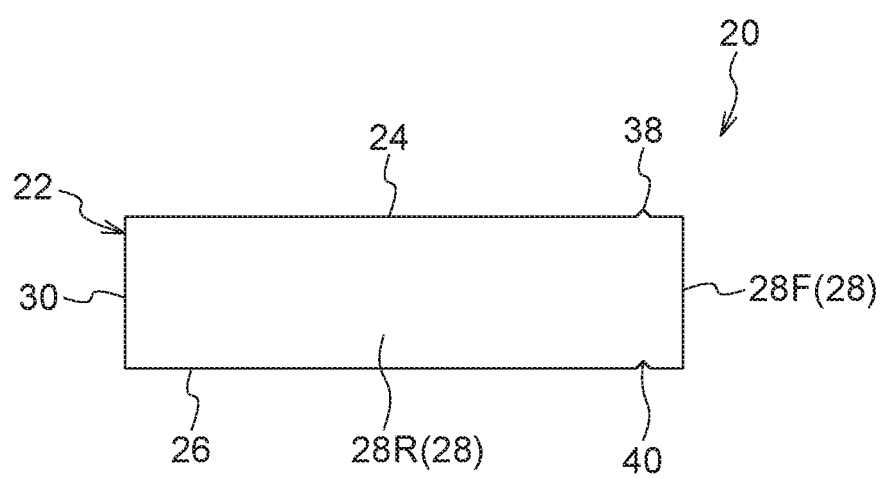
FIG. 6 is a right side view of a tape cartridge housing case according to the present exemplary embodiment.
Figure 7:
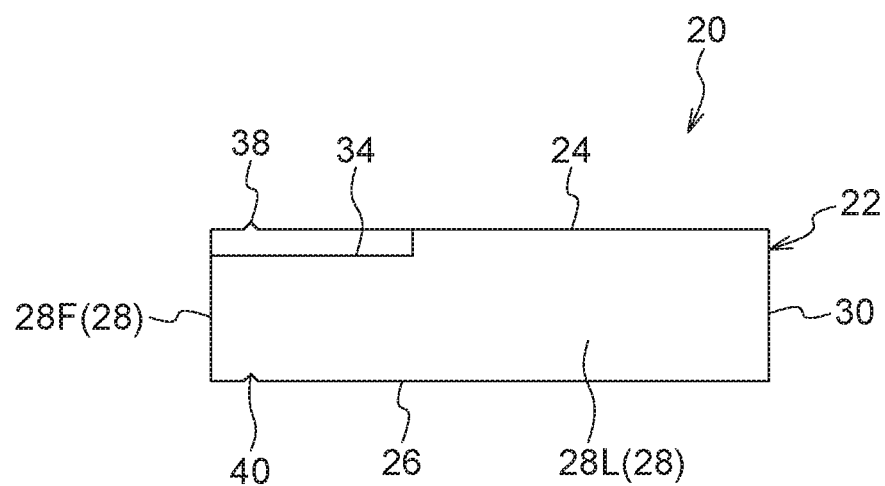
FIG. 7 is a left side view of a tape cartridge housing case according to the present exemplary embodiment.

First, brief explanation follows regarding the tape cartridge 10. As illustrated in FIG. 1, the tape cartridge 10 includes a resin case 12 configured in a substantially rectangular box shape. A single resin reel (not illustrated in the drawings), around which a magnetic tape is wound, is housed inside the case 12. Configuration is made such that the reel only rotates inside the case 12 in a case in which the tape cartridge 10 is loaded in a drive device (not illustrated in the drawings).

At a rear face 12B side inside the case 12, a memory card (not illustrated in the drawings) is disposed in an inclined state, for example at an angle of 45° as viewed from the side along the left-right direction. The memory is stored with various information relating to the tape cartridge 10. The information can be read, and the information can be written (overwritten) as required, by communication with the drive device and a library device (not illustrated in the drawings).

Note that the library device is a device that houses plural of the tape cartridges 10, and that automatically loads the tape cartridges 10 into the drive device and removes the tape cartridges 10 from the drive device using a robotic hand. The library device is configured to access the memory from the rear face 12B side of the case 12, and the drive device is configured to access the memory from a lower face 12D side of the case 12.

Moreover, a cut-away portion 14 with a substantially right-angled triangle shape in plan view is formed at a corner portion where an upper face 12U, a front face 12F, and a left face 12L of the case 12 intersect. The cut-away portion 14 matches (fits together with) a step portion 34 of the tape cartridge housing case 20, described later, so as to give a configuration in which the tape cartridge 10 is stored in the tape cartridge housing case 20 with its front-rear direction the correct way around.

Respective pairs of (plural) stacking recesses 16 that are substantially rectangular shaped in plan view are formed at a left-right direction separation to each other at a front side end portion and a rear side end portion of the upper face 12U of the case 12. Respective pairs of (plural) stacking ribs 18 (see also FIG. 8A), serving as projections, that are substantially rectangular shaped in plan view are formed at a left-right direction separation to each other at a front side end portion and a rear side end portion of the lower face 12D of the case 12.

A base surface area of each stacking rib 18 is set to a base surface area of the respective stacking recess 16 or smaller in bottom view (plan view). Accordingly, configuration is made such that in a case in which plural of the cases 12 are stacked, the respective stacking ribs 18 of a case 12 on the upper side are inserted into the respective stacking recesses 16 of a case 12 on the lower side. Plural of the cases 12 can accordingly be stacked stably.

Next, explanation follows regarding the tape cartridge housing case 20 (also referred to below simply as the "housing case 20") that stores the tape cartridge 10.

As illustrated in FIG. 1 to FIG. 8, the housing case 20 includes a bookcase shaped case body 22 capable of storing the tape cartridge 10 so as to leave virtually no gap. The case body 22 is formed from an opaque resin, and is capable of protecting the tape cartridge 10 from impact when dropped, for example.

Specifically, the case body 22 includes an upper wall portion 24 that covers the upper face 12U of the case 12 of the tape cartridge 10, a lower wall portion 26 that covers the lower face 12D of the case 12, side wall portions 28 that cover all of the side faces (3 faces) of the case 12 with the exception of the rear face 12B, this being one side face thereof, and the opening 30 that the tape cartridge 10 is inserted and removed through, and that exposes the rear face 12B of the case 12.

The side wall portions 28 are configured by a front wall portion 28F that covers the front face 12F of the case 12, a left wall portion 28L that covers the left face 12L, and a right wall portion 28R that covers a right face 12R. Cut-away portions 32 with substantially isosceles trapezoidal shapes in plan view are formed at rear side end portion centers of the upper wall portion 24 and the lower wall portion 26 on the opening 30 side to facilitate removal of the stored tape cartridge 10 from the housing case 20 (facilitate gripping the rear side of the case 12 from above and below).

A corner where the upper wall portion 24, the front wall portion 28F, and the left wall portion 28L of the case body 22 intersect is formed with the step portion 34 that has a substantially right-angled triangle shape in plan view. The step portion 34 is formed with a shape and dimensions similar to those of the cut-away portion 14 of the tape cartridge 10. Configuration is made such that the cut-away portion 14 matches (fits together with) the step portion 34 so as to leave virtually no gap after the tape cartridge 10 is stored in the housing case 20.

This configuration prevents incorrect insertion of the tape cartridge 10 into the housing case 20. Namely, the step portion 34 obstructs insertion of the tape cartridge 10 into the housing case 20 in a case in which the tape cartridge 10 is inserted into the housing case 20 with the front and rear or the top and bottom inverted.

An inner face at a front end side of the lower wall portion 26 of the case body 22 is formed with a first protrusion 36 (see FIG. 2, FIG. 8) with a triangular shaped cross-section extending along the left-right direction following an edge portion of the front wall portion 28F. A recess 40 (see FIG. 1, FIG. 5 to FIG. 8) with a triangular shaped cross-section is formed on an outer face of the lower wall portion 26 at a position so as to be on the opposite side to the first protrusion 36 in a front face-back face relationship. Moreover, a second protrusion 38 (see FIG. 1 to FIG. 4, FIG. 6 to FIG. 8) with a triangular shaped cross-section capable of fitting together with the recess 40 is formed at an outer face of the upper wall portion 24 at the same position as the recess 40 in plan view.

As illustrated in FIG. 8A, the first protrusion 36 is configured so as to anchor the stacking ribs 18 formed at the front side end portion of the case 12 from the rear side after the tape cartridge 10 is stored in the housing case 20. The stacking ribs 18 therefore also serve as an anchored portion that is anchored by the first protrusion 36. Accordingly, the tape cartridge 10 stored in the housing case 20 does not fall out from the housing case 20 unintentionally.

Figure 9:
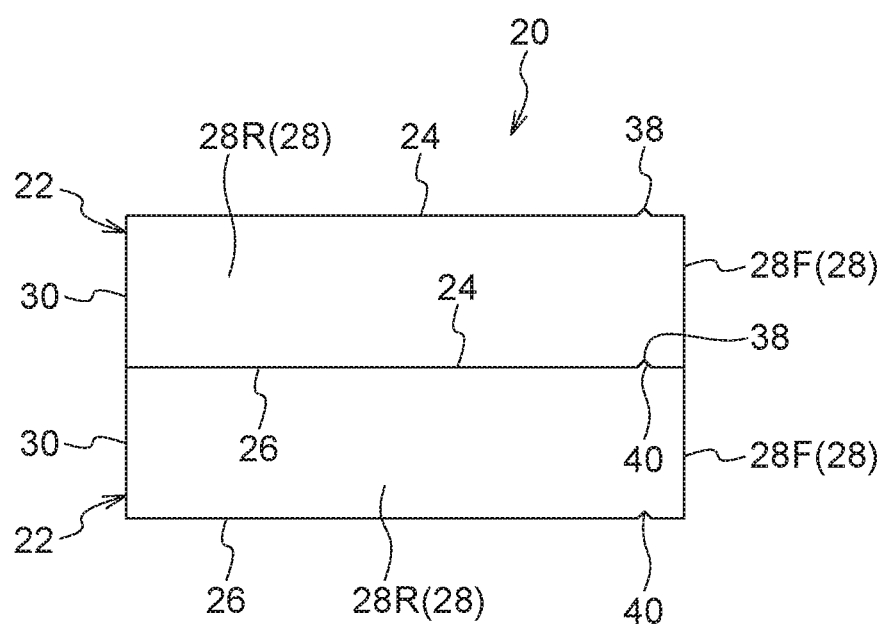
FIG. 9 is a right side view illustrating tape cartridge housing cases according to the present exemplary embodiment in a stacked state.

As illustrated in FIG. 9, in a case in which plural of the housing cases 20 are stacked, the second protrusion 38 of a lower side housing case 20 is inserted into (fits together with) the recess 40 of an upper side housing case 20. This thereby enables plural of the housing cases 20 to be stacked stably. Namely, the housing cases 20 can be stacked without positional displacement in directions orthogonal to the axial direction of the reels (particularly in the front-rear direction).

At least one out of the upper wall portion 24, the lower wall portion 26, or the respective side wall portions 28 of the housing case 20 displays externally visible information (not illustrated in the drawings) relating to the tape cartridge 10. Specifically, precautions for use of the tape cartridge 10, the maker, product information, storage capacity, designs, or the like of the tape cartridge 10 are displayed by, for example, printing or molding onto the surface of the housing case 20.

Next, explanation follows regarding operation of the tape cartridge housing case 20 configured as described above.

In order to store the tape cartridge 10 in the housing case 20, as illustrated in FIG. 1, the tape cartridge 10 is inserted from its front side into the opening 30. As the tape cartridge 10 is being stored in the housing case 20, the pair of left and right stacking ribs 18 formed at the front side end portion of the lower face 12D of the case 12 ride over the first protrusion 36 and are anchored by the first protrusion 36 from the rear side (see FIG. 8A).

The tape cartridge 10 is thereby prevented from unintentionally falling out through the opening 30 of the housing case 20. Note that the first protrusion 36 is formed at the front end side, this being the downstream side in the insertion direction of the tape cartridge 10. Accordingly, in a case in which the tape cartridge 10 is inserted into the housing case 20, a leading end portion (upper end portion) of the first protrusion 36 is suppressed or prevented from rubbing against and being worn down by the lower face 12D of the tape cartridge 10.

Since the existing stacking ribs 18 formed at the case 12 of the tape cartridge 10 are anchored by the first protrusion 36, this does not entail design modifications to a mold (not illustrated in the drawings) for forming the case 12, in contrast to configurations in which projections (not illustrated in the drawings) formed at the case 12 separately to the stacking ribs 18 are anchored by the first protrusion 36. Namely, the tape cartridge 10 does not incur the drawback of increased manufacturing costs.

In a case in which the tape cartridge 10 is stored in the housing case 20, the cut-away portion 14 of the tape cartridge 10 matches the step portion 34 of the housing case 20. The tape cartridge 10 is accordingly stored in the correct orientation in the housing case 20. Namely, for example, if the tape cartridge 10 is inserted into the housing case 20 with the front and rear or the top and bottom inverted, the step portion 34 impinges on a corner of the case 12, obstructing any further insertion of the tape cartridge 10, and thereby preventing incorrect insertion of the tape cartridge 10 facing in the wrong direction.

Gripping of the rear side of the tape cartridge 10 from above and below when removing the tape cartridge 10 from the housing case 20 is facilitated by forming the cut-away portions 32 at the rear side end portion centers on the opening 30 side of the upper wall portion 24 and the lower wall portion 26. Since the stacking ribs 18 are only anchored by the first protrusion 36, the tape cartridge 10 is easily removed from the housing case 20.

In a stored state in the housing cases 20, plural of the tape cartridges 10 are often stacked along the reel axial direction to be put into storage or transported. Accordingly, when stacking plural of the housing cases 20 along the reel axial direction, the recess 40 of an upper side housing case 20 is fitted together with the second protrusion 38 of a lower side housing case 20.

Accordingly, as illustrated in FIG. 9, plural of the housing cases 20 can be stacked stably without positional displacement in directions orthogonal to the reel axial direction, in particular in the front-rear direction. This thereby enables issues such as the housing cases 20 collapsing and the tape cartridges 10 inside the housing case 20 falling out under their own weight and sustaining damage, to be suppressed or prevented from occurring in a case in which the housing cases 20 in which the tape cartridges 10 are stored are being put into storage or transported.

The recess 40 and the second protrusion 38 enable plural of the housing cases 20 to be stacked with the rear faces 12B of each of the tape cartridges 10 exposed from the openings 30 facing in a single direction. Namely, the respective memory cards disposed at the rear face 12B side of the respective tape cartridges 10 can be made to face in a uniform direction. This thereby enables a simple storage shelf (part of the library device) to be configured by the plural stacked housing cases 20.

The housing case 20 is formed with the recess 40 on the opposite side to the first protrusion 36 in a front face-back face relationship, and therefore has the advantage that the first protrusion 36 and the recess 40 are easier to form than in configurations in which the recess 40 is not formed on the opposite side to the first protrusion 36 in a front face-back face relationship. Namely, forming the recess 40 for stacking the housing cases 20 has the advantage of enabling the first protrusion 36 for preventing the tape cartridge 10 from falling out to be formed without forming a thickened portion on the lower wall portion 26.

At least one out of the upper wall portion 24, the lower wall portion 26, and the respective side wall portions 28 of the housing case 20 displays externally visible information relating to the tape cartridge 10. This thereby enables a reduction in costs relating to selling the tape cartridge 10 stored in the housing case 20 in comparison to configurations in which separate index cards, labels (neither of which are illustrated in the drawings), or the like printed with information relating to the tape cartridge 10 are stored in the housing case 20 together with the tape cartridge 10.

Explanation has been given with reference to the drawings regarding the tape cartridge housing case 20 according to the present exemplary embodiment. However, the tape cartridge housing case 20 according to the present exemplary embodiment is not limited to that illustrated in the drawings, and the design may be modified as appropriate within a range not departing from the spirit of the present disclosure. For example, the housing case 20 is not limited to being opaque, and may be transparent or translucent.

The first protrusion 36 and the recess 40 respectively extend along the left-right direction as far as the left wall portion 28L and the right wall portion 28R of each housing case 20, and the second protrusion 38 extends along the left-right direction as far as the step portion 34 and the right wall portion 28R. However, there is no limitation thereto. The first protrusion 36, the second protrusion 38, and the recess 40 may, for example, each be formed slightly shorter than illustrated in the drawings, or may be formed non-continuously. However, if the first protrusion 36 extends in the left-right direction following an edge portion of the front wall portion 28F, for example, the advantage of being able to anchor the stacking ribs 18 remains even if the positions of the stacking ribs 18 in the left-right direction vary according to the type of the tape cartridge 10.

The shapes of the first protrusion 36, the second protrusion 38, and the recess 40 are not limited to triangular shaped cross-sections, and, for example, may be rectangular cross-sections. Moreover, the numbers of the first protrusion 36, the second protrusion 38, and the recess 40 are not limited to one of each, as illustrated in the drawings. The tape cartridge 10 stored in the housing case 20 may be inbuilt with read-only Radio Frequency Identification (RFID) or the like in addition to, or instead of, the memory.

What is claimed is:

1. A tape cartridge housing case comprising:
    a case body including:
        an upper wall portion that is configured to cover an upper face of a tape cartridge that the housing case is configured to receive,
        a lower wall portion that is configured to cover a lower face of the tape cartridge,
        side wall portions that are configured to cover every side face of the tape cartridge except for one side face, and
        an opening that is configured to receive the tape cartridge in an insertion direction and to expose the one side face;
    a first protrusion that is formed at an inner face of the lower wall portion of the case body, downstream from the opening in the insertion direction, and that is configured to anchor an anchored portion of the tape cartridge, in a case in which the case body houses the tape cartridge;
    a recess that is formed at an outer face of the lower wall portion at a position so as to be on the opposite side to the first protrusion in a front face-back face relationship; and
    a second protrusion that is formed at an outer face of the upper wall portion at the same position as the recess in plan view, and that is formed with a shape capable of fitting together with the recess,
    wherein a step portion is formed at a single corner portion of a side face facing the opening on the upper wall portion of the case body, the step portion corresponding to a cut-away portion at a corner portion of the tape cartridge such that the tape cartridge housing case stores the tape cartridge in a correct orientation.

2. The tape cartridge housing case of claim 1, wherein the step portion is formed in a substantially triangular shape in plan view.

3. The tape cartridge housing case of claim 1, wherein:
the first protrusion is formed at the case body so as to follow an edge portion of the case body on the downstream side in the insertion direction of the tape cartridge.

4. The tape cartridge housing case of claim 1, wherein at least one of the upper wall portion, the lower wall portion, or the respective side wall portions, displays information relating to the tape cartridge.

* * * * *